(12) United States Patent
Gjerde

(10) Patent No.: US 9,810,351 B2
(45) Date of Patent: Nov. 7, 2017

(54) DOUBLE HOSE DEVICE

(71) Applicant: Safehose Holding AS, Gjerdsvika (NO)

(72) Inventor: Roger Gjerde, Larsnes (NO)

(73) Assignee: Safehose Holding AS, Gjerdsvika (NO)

( * ) Notice: Subject to any disclaimer, the term of this patent is extended or adjusted under 35 U.S.C. 154(b) by 0 days.

(21) Appl. No.: 14/917,604

(22) PCT Filed: Sep. 2, 2014

(86) PCT No.: PCT/NO2014/050156
§ 371 (c)(1),
(2) Date: Mar. 9, 2016

(87) PCT Pub. No.: WO2015/038001
PCT Pub. Date: Mar. 19, 2015

(65) Prior Publication Data
US 2016/0223102 A1 Aug. 4, 2016

(30) Foreign Application Priority Data
Sep. 10, 2013 (NO) .................................. 20131220

(51) Int. Cl.
*F16L 11/00* (2006.01)
*F16L 11/133* (2006.01)
(Continued)

(52) U.S. Cl.
CPC .............. *F16L 11/133* (2013.01); *F16L 11/20* (2013.01); *F16L 33/01* (2013.01); *F17D 5/02* (2013.01);
(Continued)

(58) Field of Classification Search
USPC ........................................ 138/104, 109, 114
See application file for complete search history.

(56) References Cited

U.S. PATENT DOCUMENTS 3,934,617 A 1/1976 Henderson
4,383,554 A * 5/1983 Merriman ............. E21B 17/015
138/101

(Continued)

FOREIGN PATENT DOCUMENTS

CA 2472989 A1 1/2006
WO 2009008728 A1 1/2009
WO 2010041955 A1 4/2010

OTHER PUBLICATIONS

International Search Report and Written Opinion dated Oct. 7, 2014 (PCT/NO2014/050156).

*Primary Examiner* — James Hook
(74) *Attorney, Agent, or Firm* — Alix, Yale & Ristas, LLP

(57) ABSTRACT

Device for a double hose structure with an inner main hose and an outer cover hose defining an annular space giving buoyancy in water. At least one end is provided with a coupling member forming a mount for the main hose and the cover hose which at a free end merges into a threaded portion for connecting the hose assembly to an auxiliary connection. The coupling member comprises an inner coupling sleeve connected to one end of the main hose and an outer coupling sleeve connected to the cover hose, the inner and outer coupling sleeves being mutually connected forming a liquid tight termination of the annulus by a ring-shaped plate. The plate is attached with screws through holes only to the outer sleeve, the plate being forced against a shoulder of the inner coupling sleeve by a ring nut with internal threads matching external threads on the inner sleeve.

10 Claims, 2 Drawing Sheets

(51) Int. Cl.
*F17D 5/02* (2006.01)
*F16L 11/20* (2006.01)
*F16L 33/01* (2006.01)
*F16L 39/02* (2006.01)
*B63B 27/34* (2006.01)

(52) U.S. Cl.
CPC .............. *B63B 27/34* (2013.01); *F16L 39/02* (2013.01); *F16L 2201/30* (2013.01)

(56) References Cited

U.S. PATENT DOCUMENTS

| | | | |
|---|---|---|---|
| 4,666,191 A * | 5/1987 | Sotelo | F16L 33/01 138/103 |
| 5,423,353 A | 6/1995 | Sorensen | |
| 5,456,502 A * | 10/1995 | Sharp | F16L 39/005 138/114 |
| 6,085,796 A | 7/2000 | Riga | |
| 6,220,303 B1 * | 4/2001 | Secher | E21B 17/017 138/109 |
| 6,349,976 B1 | 2/2002 | Taylor, Jr. | |
| 2004/0051308 A1 | 3/2004 | Coates | |
| 2004/0066035 A1 * | 4/2004 | Buon | F16L 33/003 285/222.2 |
| 2006/0000515 A1 * | 1/2006 | Huffman | F16L 11/133 138/114 |
| 2009/0322077 A1 * | 12/2009 | Eccleston | F16L 33/01 285/337 |
| 2010/0186845 A1 * | 7/2010 | Knotten | F16L 11/133 138/104 |
| 2014/0124076 A1 * | 5/2014 | Roberts | F16L 33/01 138/109 |

* cited by examiner

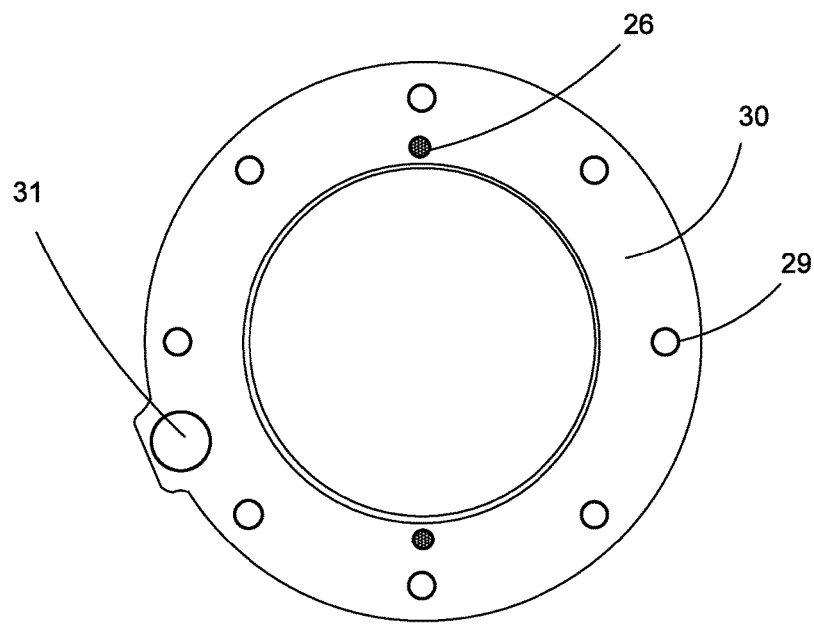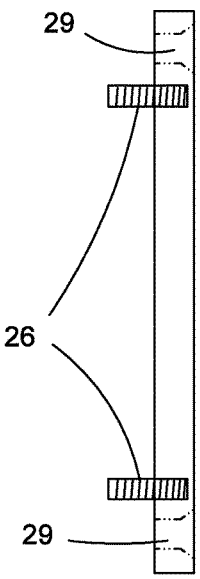
Fig. 3a                    Fig. 3b
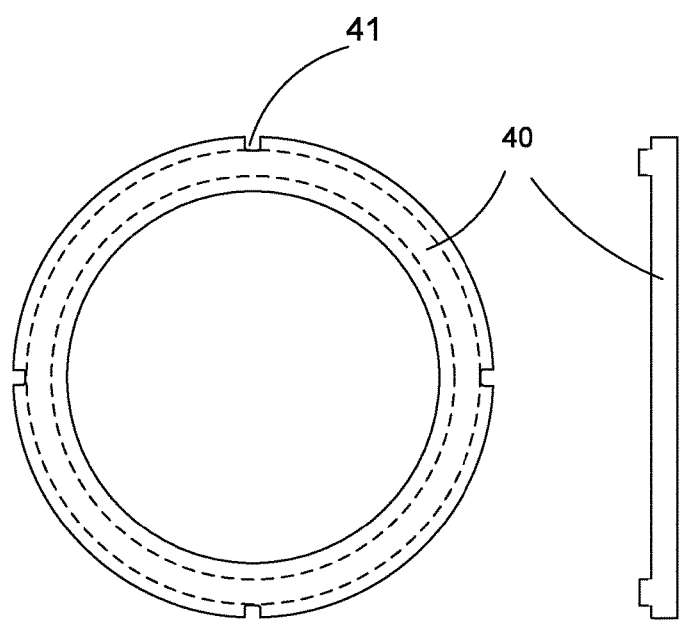
Fig. 4a          Fig. 4b

DOUBLE HOSE DEVICE

BACKGROUND

The disclosure relates to a device for a hose, and more specifically a device for a double hose. For transfer of pumpable media at sea, such as for bunkering to platforms from supply ships or transfer of sludge from a platform to a supply ship, hoses that can float on water are used. For this purpose it is known to attach float elements on conventional hoses or to attach the tubular sheaths of foamed material to the hoses. Both of these hose assemblies provide buoyancy, but do not contribute to increase safety. Besides, these hose designs are not convenient and wear resistant.

In connection with the increased emphasis on the problems of pollution by emissions a need for safety beyond upgrade the dimensions of hoses has arisen.

Double hoses where the outer hose (cover hose) has been dedicated to capture leakage from the inner hose (main hose) have been suggested. Such safety hoses have provided the opportunity of designing hoses that float in water. But the main object of increasing safety has prevented creation of a satisfactory floating hose. For example, U.S. Pat. No. 6,085,796 (Riga, 2000) discloses a composite safety hose constituting an inner and an outer hose, which has been designed for hydraulic systems with low transportation capacity. The design of the end connections has not been satisfactory.

Double hoses with foam material in the outer annulus, a.o. to form thermal insulation, are also well known. Such a structure is described in U.S. Pat. No. 6,349,976 (Mentor Subsea, 2002), but this has not been suitable as floating hose.

Other known hose systems are described in Norwegian Patents Nos. 328 496 and 329 261. In the latter an inner and an outer hose employing a coupling element forming attachment for the main hose and cover hose is used, the free end of which is connected to a coupling element for connection to an external connection, said coupling element comprising an inner sleeve into which the end of the main hose is inserted for attachment, the inner sleeve being provided with threads at its free end for connection to a pipe system. The coupling element furthermore includes an outer sleeve attached to the cover hose and a connecting element for releasaable connection of the inner sleeve to the outer sleeve. Finally, the system of the mentioned patent includes a one-way valve allowing the emptying of the cover hose to the main hose.

The system has been shown to work excellent in the field of technology, but attaching the connecting element to the inner sleeve by means of screws has proven difficult. The problem is thermal expansion during welding. The inner sleeve has an ring-shaped extension comprising screw holes. This ring is typically welded onto the inner sleeve as part of the manufacturing process. The welding causes a thermal expansion which causes an inaccurate and often unsatisfactory positioning of the screw holes.

SUMMARY

It would be desirable to provide a double hose assembly with performance properties at least equivalent to the properties of the hose described in Norwegian patent no. 329261 and wherein said disadvantage in connecting inner and outer coupling parts is avoided. It would further be desirable if the hose system was leak-proof, easy and inexpensive to manufacture, easy and inexpensive to use, easy to assemble and disassemble and easy to recoil after use.

BRIEF DESCRIPTION OF THE DRAWINGS

Further details of the inventive embodiments are apparent from the detailed description and drawings, wherein like numerals reflect like elements throughout.

FIG. 3a shows a ring-shaped cover plate for use within the disclosed double hose system from the front.

FIG. 3b shows the cover plate of FIG. 3a from the side.

FIG. 4a shows a ring nut for use within the disclosed double hose system from the front.

FIG. 4b shows the ring nut of FIG. 4a from the side.

DETAILED DESCRIPTION

Figure 1:
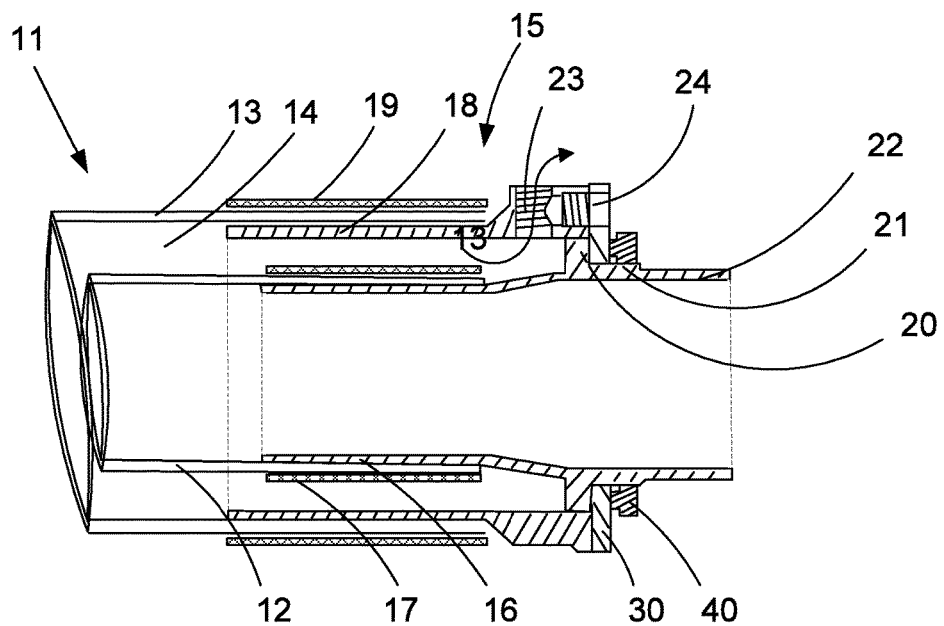
FIG. 1 shows the end of an assembled double ("compound") hose in hose accordance with the disclosure.

FIG. 1 shows the end of an assembled, double-hose 11 designed in accordance with the disclosed embodiments. The main element is an inner main hose 12 which may be adapted to transfer fuel oil, sludge, or other pumpable mass between two units that are separated at sea so that the hose must be scheduled on a water surface.

The main hose 12 is surrounded by a cover hose 13, which has a diameter sufficiently large that there is an annular space 14 between the main hose and cover long hoses. In a preferred embodiment, the space 14 is filled with air to provide buoyancy in water, so that the hose 11 will remain floating on the water. However, other embodiments are filled with another gas, or wholly or partly with a foam material. To maintain the distance between the main hose 12 and the cover hose 13, spacers may in an alternative embodiment be included, for example in the form of a tubular wave profile in the space 14.

For connecting the main hose 12 and the cover hose 13 is at each end or at any splicing joint, a coupling member 15 which in this case is composed as described below, is arranged.

The main hose 12 is adapted to be connected to an end portion of an inner coupling sleeve 16 and can be further secured thereto by an inner clamping sleeve 17 which surrounds the main hose. The inner coupling sleeve 16 furthermore comprises an annular shoulder 20 and at least one threaded portion 21, 22. FIG. 1 shows a first threaded portion 21 having external threads of a dimension and to the right another threaded portion 22 having external threads of dimension smaller than the first threaded portion 21. The significance of these is explained below.

The cover hose 13 is adapted to be attached to an end portion of an outer coupling sleeve 18 and can be further secured thereto by means of an outer clamping sleeve 19. The outer coupling sleeve has a threaded open passage 23 suitable to receive a pressure sensor (not shown) mounted radially relative to the coupling sleeve 18. A sealing screw 24 is shown in an axial passage from the open passage 23. This allows the user to choose whether an optional pressure sensor is to be mounted axially or radially relative to the outer coupling sleeve 18.

FIG. 1 also shows a ring-shaped cover plate 30 affixed to the outer coupling sleeve 18 in a manner that is further explained below, and a ring nut having internal threads corresponding to the threads in the first threaded portion 21 of the inner coupling sleeve.

Figure 2A:
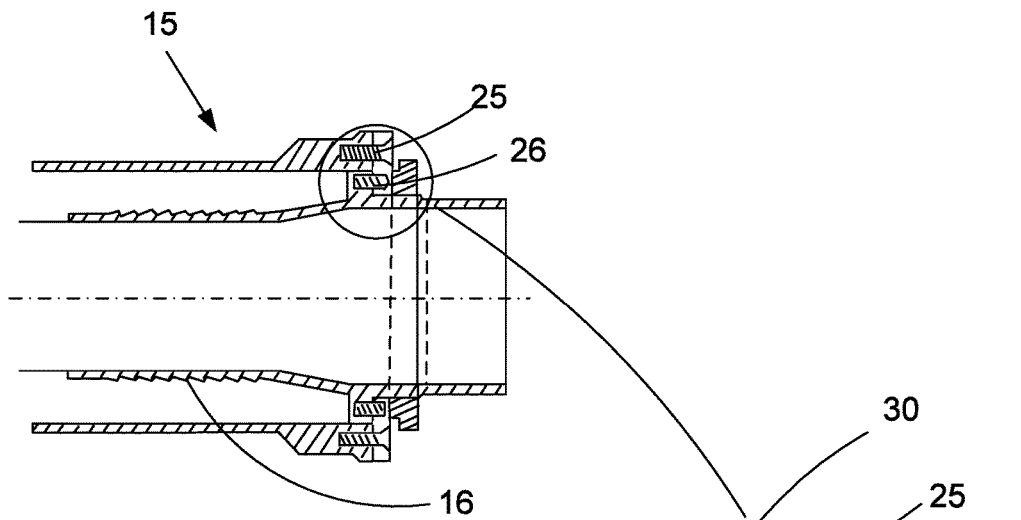
FIG. 2a shows a different view and configuration of the disclosed double hose.

FIG. 2*a* shows in principle the same as FIG. 1 with the exception of the elements mentioned in the following. In FIG. 2*a* the hoses 12 and 13 are not shown and thus neither the inner and outer clamping sleeves 17 and 19. In addition, inner coupling sleeve 16 is shown having a knurled outer surface in the area adapted to receive a main hose. A further element which is different in FIG. 2*a* compared to FIG. 1, is that the entire assembly is rotated so that fastening screws 25 and set screws 26 are located in the cut surface, whereas the passage for the pressure sensor is out of the cut surface.

Figure 2B:
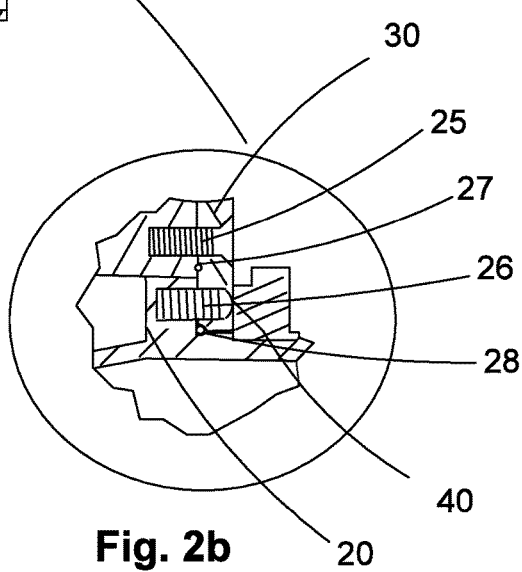
FIG. 2b shows a portion of the device of FIG. 2a enlarged to show detail.

FIG. 2*b* shows a detail (circled) of FIG. 2*a* enlarged, comprising a fastening screw 25, a set screw 26 and two O-rings, an outer O-ring 27 and an inner O-ring 28. It is worth noting, and it is a significant difference compared to the hose system described in Norwegian patent no. 329261; that the ring-shaped cover plate is fastened with fastening screws 25 only to the outer coupling sleeve 18 and is fluid-tight against this by an outer O-ring 27. The set screws 26 are attached in non-penetrating threaded holes in the cover plate 30 and their sole purpose is to prevent relative rotation between the inner coupling sleeve 16 and the external coupling sleeve 18. These set screws thus fits into bores in the inner coupling sleeve 16 and more specifically in the annular shoulder 20 thereof.

FIGS. 3*a* and 3*b* show the ring-shaped cover plate 30 from the front, respectively from the side, with set screws 26, holes 29 for fastening screws and an orifice 31 for optional axial mounting of the pressure sensor, as describe above with reference to FIG. 1.

FIGS. 4*a* and 4*b* show the ring nut 40 from the front, respectively from the side. They show recesses 41 suited to cooperate with tools adapted to tighten the ring nut to the threaded portion 21 of the inner coupling sleeve, thereby securely and fluid-tight attaching the inner coupling sleeve to the outer coupling sleeve, assisted by O-ring 28. This method for mutual connection of the coupling sleeves is significantly better than using screws also into the inner coupling piece, both in terms of precision and quickness in assembly and disassembly. It is also absolutely leak-proof.

For assembly of the hose construction of the present invention, an outer coupling sleeve 18 including outer clamping sleeve 19 is attached to the end of a cover hose 13. The ring-shaped cover plate 30 is not attached at this point. Corresponding coupling sleeve 18 with clamping sleeve 19 is normally attached to other end of the cover hose. A main hose 12 with approximately the same length as cover hose 13 is equipped with an inner coupling sleeve 16 and corresponding inner clamping sleeve 17, preferably at both ends of the main hose 12.

The main hose then is pulled through the cover hose with a suitable tool, such as cord or chain until threaded portion 21 projects from the free end of the outer coupling sleeve 18. Thereafter, the ring-shaped cover plate 30 is guided over the free threaded portions 22 and 21 and screwed to the end of the outer coupling sleeve 18, with sealing O-rings 27 28 disposed therebetween. Finally, the ring nut 40 is guided over the threaded portion 22 and screwed into the threaded portion 21. Simultaneously, it is ensured, if required, by slightly rotating inner coupling sleeve in relation to the external coupling sleeve that set screws 26 hits adapted holes or recesses in the projecting shoulder 20 of the inner coupling sleeve. Thereby relative rotation between inner and outer coupling sleeve is made impossible. The ring nut tightened so that there is tight engagement between the ring nut 40, ring-shaped cover plate 30 and the shoulder 20. Thereby a fluid tight connection between the cavity 14 and the surroundings is ensured, provided that any passages 23 are sealed by sensor elements (not shown) or sealing screw 24.

This coupling is much easier to assemble sufficiently tight than a plate through which axial screws are used into outer as well as inner coupling sleeve. The threaded portion 22 at the free end of the inner sleeve 16 is intended for connection to auxiliary equipment. In principle, the same threaded portion may be used also for the ring nut 40, but this would require far more turns to tighten the ring nut, and there may be undesired interactions between the ring nut and the auxiliary device, possibly with the consequence that the coupling over time does not remain liquid tight.

Optionally, the screw heads 25 may be bevelled with a bevel corresponding to a bevel in the holes 29 so that the tops of the screw heads 25 lie flush with the ring-shaped plate 30. The number of fastening screws can vary, but it is preferred with at least four fastening screws, and more preferably at least 6.

Furthermore, in connection with the coupling member 15 there may be a valve for discharging the cover hose into the main hose 12.

In connection with the coupling member 15 a valve for evacuation of air from the cover hose is normally arranged.

The invention claimed is:

1. A device for a double hose assembly (11) with an inner main hose (12) and an outer cover hose (13) arranged for assembly and disassembly and defining an annular space (14) providing the hose with buoyancy in water, the device having a coupling member (15) on at least one end (15) forming a mount for the main hose (12) and the cover hose (13), and having a free end that merges into a threaded portion (22) for connecting the hose assembly (11) to an auxiliary connection, the coupling member (15) comprising an inner coupling sleeve (16) which is tightly connected to one end of the main hose (12) and an outer coupling sleeve (18) which is tightly connected to the cover hose (13), the inner coupling sleeve (16) and outer coupling sleeve (18) being mutually connected to form a liquid tight termination of the annulus (14) via a ring-shaped plate (30), wherein the ring-shaped plate (30) is attached with a plurality of screws (25) through holes (29) only to the outer sleeve (18), the ring-shaped plate (30) being forced against a shoulder (20) of the inner coupling sleeve (16) by a ring nut (40) with internal threads that match external threads (21) on the inner sleeve (16) and the inner main hose (12) and the outer cover hose (13) are disassembled by unscrewing the ring nut (40).

2. The device of claim 1, comprising sealing O-rings (27, 28) arranged between the ring-shaped plate (30) and each of the inner coupling sleeve (16) and outer coupling sleeve (18).

3. The device of claim 1, comprising at least one set screw (26) intermediate the inner sleeve (16) and outer sleeve (18) to prevent relative rotation thereof.

4. The device of claim 1, wherein head portions of screws (25) have a bevelled surface corresponding to a bevelled surface in the respective holes (29) so that the tops of the screw heads (25) are flush with the ring-shaped plate (30).

5. The device of claim 1, comprising a valve in the coupling member (15) arranged for discharging the cover hose into the main hose (12).

6. The device of claim 1, comprising at least 4 fastening screws (25).

7. The device of claim 1, comprising at least 6 fastening screws (25).

8. The device of claim 1, comprising a valve connected to the coupling member (15) arranged for evacuating air from the cover hose.

9. The device of claim 1, comprising a threaded radial passage (23) connected to the outer coupling sleeve (18) arranged to permit radial positioning of a pressure sensor in relation to the hose assembly (11).

10. The device of claim 9, comprising an axial passage connected to the radial passage (23) arranged to permit axial positioning of a pressure sensor in relation to the hose assembly (11).

\* \* \* \* \*